(12) United States Patent
Araki et al.

(10) Patent No.: US 8,987,972 B2
(45) Date of Patent: Mar. 24, 2015

(54) VIBRATOR IN VIBRATION TYPE DRIVING APPARATUS AND MANUFACTURING METHOD THEREOF

(75) Inventors: Yasuyuki Araki, Kawasaki (JP); Hiroyuki Seki, Oyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 13/044,008

(22) Filed: Mar. 9, 2011

(65) Prior Publication Data

US 2011/0227454 A1   Sep. 22, 2011

(30) Foreign Application Priority Data

Mar. 16, 2010  (JP) .................... 2010-058779
Nov. 24, 2010  (JP) .................... 2010-261582
Jan. 18, 2011  (JP) .................... 2011-007695

(51) Int. Cl.
*H02N 2/02* (2006.01)
*H02N 2/00* (2006.01)

(52) U.S. Cl.
CPC .............. *H02N 2/0015* (2013.01); *H02N 2/026* (2013.01)
USPC .................................................... 310/323.16

(58) Field of Classification Search
CPC . H01L 41/09; H01L 41/0906; H01L 41/0913; H02N 2/02; H02N 2/026; H02N 2/04; H02N 2/043
USPC ................ 310/323.01–323.21, 328
See application file for complete search history.

(56) References Cited

U.S. PATENT DOCUMENTS

| | | | |
|---|---|---|---|
| 4,692,650 A | 9/1987 | Okumura et al. | |
| 4,734,971 A | 4/1988 | Dupasquier | |
| 4,752,711 A | 6/1988 | Tsukimoto et al. | |
| 5,140,214 A | 8/1992 | Kimura et al. | |

(Continued)

FOREIGN PATENT DOCUMENTS

| | | |
|---|---|---|
| CN | 101449454 A | 6/2009 |
| JP | 05-011797 U | 2/1993 |

(Continued)

OTHER PUBLICATIONS

Notification of the First Office Action dated Apr. 3, 2013, in Chinese Application No. 201110062887.3.

(Continued)

*Primary Examiner* — Derek Rosenau
(74) *Attorney, Agent, or Firm* — Fitzpatrick, Cella, Harper & Scinto

(57) ABSTRACT

A vibrator, which constitutes a vibrating device of a vibration-type driving apparatus in which the vibrating device is bonded to an electromechanical-energy-conversion element, has at least one projection portion thereon, and elliptic motion can arise at each projection portion by applying an alternating electric field to the electromechanical-energy-conversion element. A driven object moves by the elliptic motion when in contact with the projection portion in a direction intersecting with a width direction. The vibrator includes a base and the at least one projection portion, with each projection portion having at least two wall portions extending in a base out-of-plane direction, and a contact portion having a contact surface with the driven object. The contact surface connects the wall portions, and boundary portions between the base and the wall portions are provided such that displacement directions in a normal direction are the same.

29 Claims, 8 Drawing Sheets

(56) References Cited

U.S. PATENT DOCUMENTS

| | | |
|---|---|---|
| 6,198,201 B1 | 3/2001 | Okumura |
| 7,109,639 B2 | 9/2006 | Yamamoto et al. |
| 7,187,104 B2 | 3/2007 | Yamamoto et al. |
| 7,952,258 B2 * | 5/2011 | Mori .................. 310/323.01 |
| 2009/0167111 A1 | 7/2009 | Mori |
| 2009/0251026 A1 | 10/2009 | Kang et al. |
| 2010/0060107 A1 | 3/2010 | Seki et al. |

FOREIGN PATENT DOCUMENTS

| | | |
|---|---|---|
| JP | 06-024395 U | 3/1994 |
| JP | 2542528 Y2 | 4/1997 |
| JP | 11-041957 A | 2/1999 |
| JP | 2004-304887 A | 10/2004 |
| JP | 2006-174549 A | 6/2006 |
| JP | 2006-288060 A | 10/2006 |
| JP | 2008-125147 A | 5/2008 |
| JP | 2008-253068 A | 10/2008 |

OTHER PUBLICATIONS

Notification of the Second Office Action dated Nov. 25, 2013, in Chinese Application No. 201110062887.3.

Office Action in Japanese Application No. 2010-261582, dated Aug. 19, 2014.

Office Action in Japanese Application No. 2011-007695, dated Sep. 2, 2014.

* cited by examiner

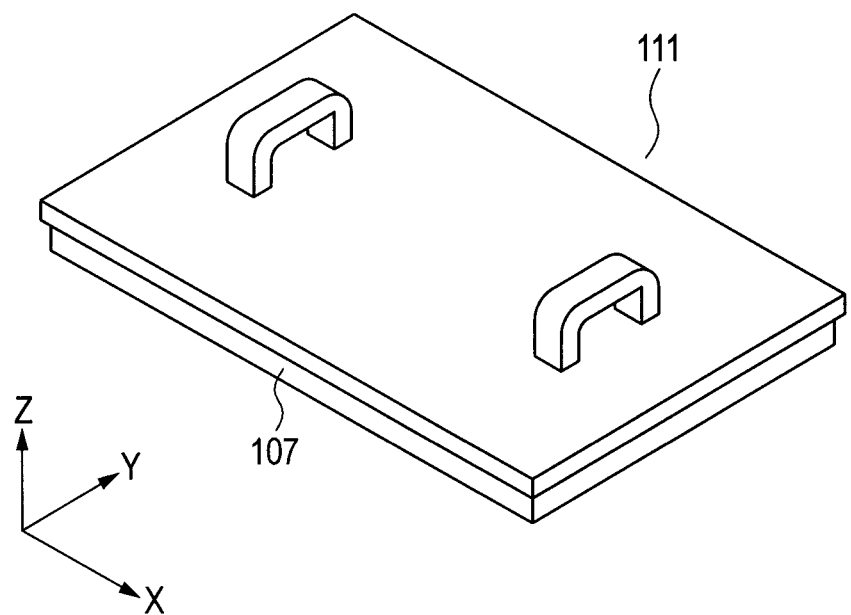
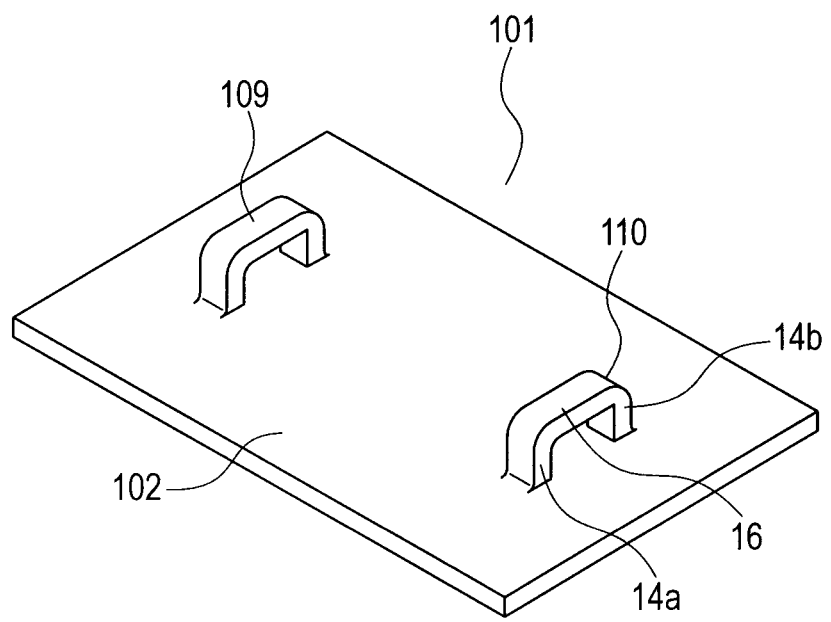

FIG. 8A
PRIOR ART
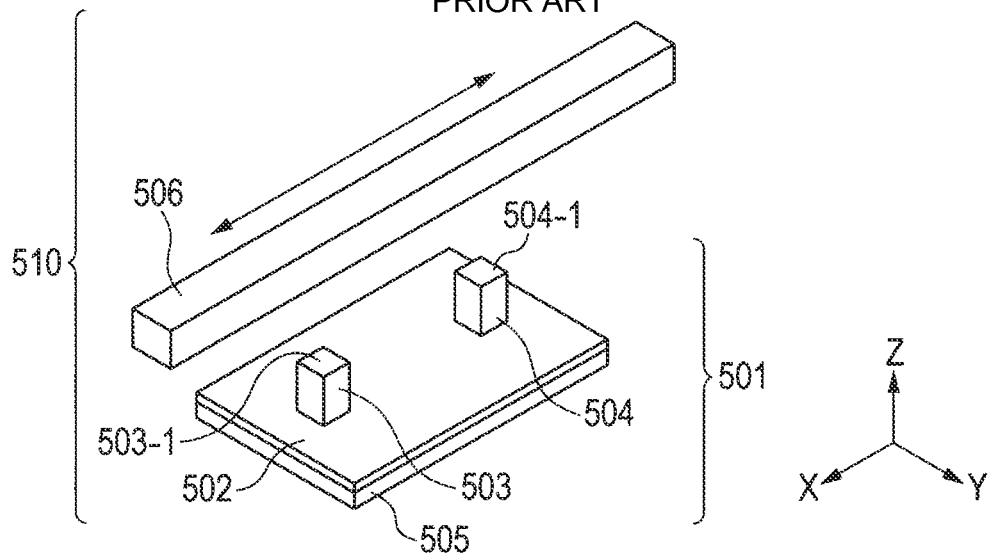
FIG. 8B-1
PRIOR ART
MODE-A
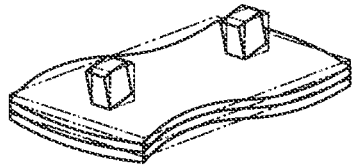
FIG. 8B-2
PRIOR ART
MODE-B
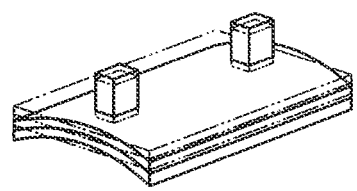
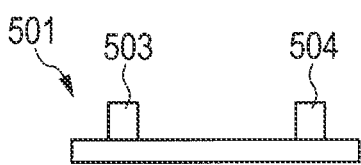
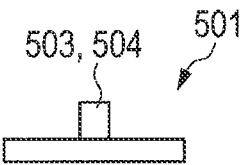
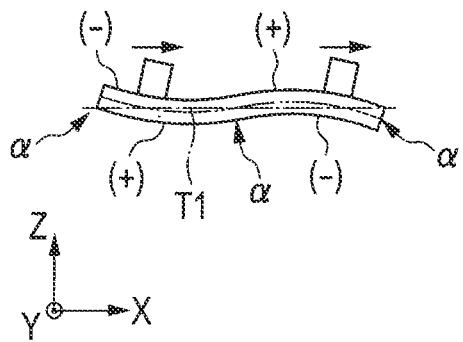
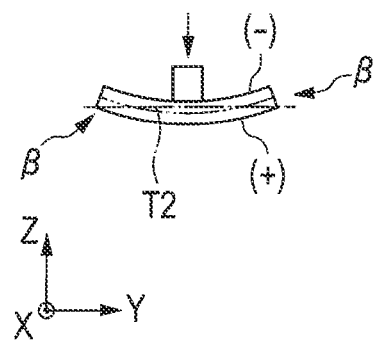

VIBRATOR IN VIBRATION TYPE DRIVING APPARATUS AND MANUFACTURING METHOD THEREOF

BACKGROUND OF THE INVENTION

1. Field of the Invention

The present invention relates to a vibrator in a vibration type driving apparatus and a manufacturing method thereof. More particularly, the present invention relates to a vibrator in a linear ultrasonic motor (vibration type driving apparatus) and a manufacturing method thereof.

2. Description of the Related Art

Conventionally, as a linear ultrasonic motor which linearly drives an object to be driven, a vibration type driving apparatus as disclosed in U.S. Pat. No. 7,109,639 has been proposed.

Here, a driving principle of the linear ultrasonic motor (vibration type driving apparatus) like this will be described with reference to the drawings.

As shown in FIG. 8A which is a perspective view illustrating an exterior appearance of the linear ultrasonic motor, a linear ultrasonic motor 510 is constituted by a vibrating device 501, a slider 506, and a pressurizing member (not illustrated) for pressurizing the vibrating device toward the slider.

The vibrating device 501 is constituted by an electromechanical energy conversion element 505 such as a piezoelectric element or the like, and a vibrator which is integrally bonded to one surface of the electromechanical energy conversion element 505. Here, the vibrator includes a base 502 which is formed rectangularly, and two projection portions 503 and 504 which are formed convexly on the upper surface of the base.

In the ultrasonic motor, if a voltage of a specific frequency (also, called an alternating electric field) is applied to the piezoelectric element, plural desired vibration modes are excited, and then the excited vibration modes are superimposed, thereby generating a vibration for driving.

The linear ultrasonic motor illustrated in FIG. 8A causes the vibrating device 501 to perform excitation of two bending vibration modes respectively illustrated in FIGS. 8B-1 and 8B-2. Both the two bending vibration modes are out-of-plane bending vibration modes of the plate-like vibrating device 501.

More specifically, one of the two out-of-plane bending vibration modes is a second-order bending vibration mode (MODE-A: feeding mode) in the longitudinal direction of the vibrating device 501, and the other of the two out-of-plane bending vibration modes is a first-order bending vibration mode (MODE-B: upthrust mode) in the width direction of the vibrating device 501.

The shape of the vibrating device 501 is designed so that the resonance frequencies of the two out-of-plane bending vibration modes coincide with each other or come close to each other.

Each of the projection portions 503 and 504 is disposed in the vicinity of a position which is a node of vibration in the vibration of the MODE-A (feeding mode). Then, each of apical surfaces 503-1 and 504-1 of the projection portions performs pendular motion using the node of the vibration as a fulcrum by means of the vibration of the MODE-A, whereby the apical surfaces perform reciprocation motion in the X direction (feeding direction).

Further, each of the projection portions 503 and 504 is disposed in the vicinity of a position which is an anti-node (or a loop) of vibration of the MODE-B (upthrust mode). Thus, the apical surfaces 503-1 and 504-1 of the projection portions perform reciprocation motion in the Z direction (upthrust direction, or normal-line direction) by means of the vibration of the MODE-B.

These two vibration modes (MODE-A and MODE-B) are simultaneously excited so that a vibration phase difference between these modes comes near $\pm\pi/2$, and these modes are then superimposed, whereby elliptic motion in the X-Z plane arises at each of the apical surfaces 503-1 and 504-1.

Thus, the slider 506 which has been pressurized and brought into contact with the vibrating device can be driven in one direction by means of the relevant elliptic motion. At this time, the projection portions 503 and 504 of the vibrating device 501 and the slider 506 repetitively make contact and non-contact at the driving frequency (tens of kilohertz or more) of the vibrating device 501. For this reason, if one of these elements does not have an appropriate spring characteristic, a satisfactory contact state cannot be obtained.

On the other hand, as described above, each of the projection portions 503 and 504 has such a function of amplifying the vibration in the X direction.

To satisfy the above-described two functions, United States Patent Application Publication US2009/167111 proposes a vibration type actuator (linear ultrasonic motor) which achieves quiet driving. Namely, in this vibration type actuator, as illustrated in FIGS. 9A to 9C, springiness is given to each of the projection portions, and each of the projection portions is designed to have an appropriate shape.

More specifically, in this vibration type actuator, projection portions 609 and 610 each of which has springiness is formed as additional members, and bonded to a base 602, whereby a vibrating device 601 is formed.

However, in the vibration type actuator described in United States Patent Application Publication US2009/167111, there is a limit to speeding up of a motor, as described later. Here, as one measure of driving a motor at higher speed, there is a method of enlarging a vibration amplitude of the projection of the vibrating device in a feeding direction (X direction).

Further, as one of the methods of enlarging the vibration amplitude of the projection in the feeding direction (X direction), there is a method of increasing the height of the projection.

However, in the vibration type driving apparatus described in U.S. Pat. No. 7,109,639, although speeding up can be achieved if the height of the projection is increased, it is not avoided that costs increase in a manufacturing process.

In the vibration type actuator described in United States Patent Application Publication US2009/167111, if the height of the projection portion of the vibrating device is increased, the rigidity of the projection portion decreases in the feeding direction, whereby driving efficiency decreases. Moreover, it becomes difficult to set a vibration angle of the apex of the projection portion to a desired value in the feeding mode. As a result, unnecessary amplitude arises in the Z direction, whereby there is a fear that contact between the projection portion and the slider becomes unstable.

The present invention has been completed in consideration of such problems as described above, and an object of the present invention is to provide a vibrator in a vibration type driving apparatus in which the vibrator capable of achieving speeding up can be manufactured at low cost and a manufacturing method of the vibrator.

SUMMARY OF THE INVENTION

According to one aspect of the present invention, there is provided a vibrator which constitutes a vibrating device of a vibration type driving apparatus which comprises the vibrating device bonded to an electromechanical energy conversion element and comprising the vibrator having one or plural projection portions thereon, in which the vibrating device is constituted so that elliptic motion can arise at the projection portion of the vibrator by application of an alternating electric field to the electromechanical energy conversion element, and which moves by the elliptic motion an object to be driven being in contact with the projection portion of the vibrator in a direction intersecting with a width direction of the vibrator, wherein the vibrator comprises a base and the one or the plural projection portions, each projection portion is formed by at least two wall portions which extend in an out-of-plane direction of the base and a contact portion which has a contact surface with the object to be driven, and the contact surface connects the wall portions with each other, and, boundary portions between the base and the respective wall portions are provided at positions such that directions of displacement in a normal direction on a main surface of the base are the same direction.

According to another aspect of the present invention, there is provided a manufacturing method of the above-described vibrator which constitutes the vibrating device of the vibration type driving apparatus, the manufacturing method comprising: preparing one member to integrally form the projection portion and the vibrator, and forming plural slits or notches in a partial region of the member; and forming, by using a part of a portion positioned between the slits or the notches, the projection portion by a bending process or a drawing process. According to the present invention, it is possible to achieve the vibrator in the vibration type driving apparatus in which the vibrator capable of achieving speeding up can be manufactured at low cost and the manufacturing method of the vibrator.

Further features of the present invention will become apparent from the following description of the exemplary embodiments with reference to the attached drawings.

BRIEF DESCRIPTION OF THE DRAWINGS

FIG. 1 is a perspective view for describing a vibrator of a vibration type driving apparatus (linear ultrasonic motor) according to the first embodiment of the present invention.

FIG. 2 is a view for describing the vibrator of the vibration type driving apparatus according to the first embodiment of the present invention.

FIG. 7A is the view for describing a case where a boundary surface between a projection portion and a base is set between nodes in vibration of the first-order bending mode in the Y direction, and FIG. 7B is the view for describing a case where the boundary surface is set outside the respective nodes in vibration of the first-order bending mode.

FIGS. 8A, 8B-1 and 8B-2 are views for describing the conventional vibration type driving apparatus (linear ultrasonic motor), where FIG. 8A is the perspective view illustrating the exterior appearance of the linear ultrasonic motor described in U.S. Pat. No. 7,109,639, and FIGS. 8B-1 and 8B-2 are the views indicating vibration modes with which vibration is excited by the vibrating device of the relevant linear ultrasonic motor.

FIG. 9A is the perspective view of the vibrating device, FIG. 9B is the enlarged view of the projection portion, and FIG. 9C is the cross-sectional view of the projection portion.

DESCRIPTION OF THE EMBODIMENTS

Figure 3A:
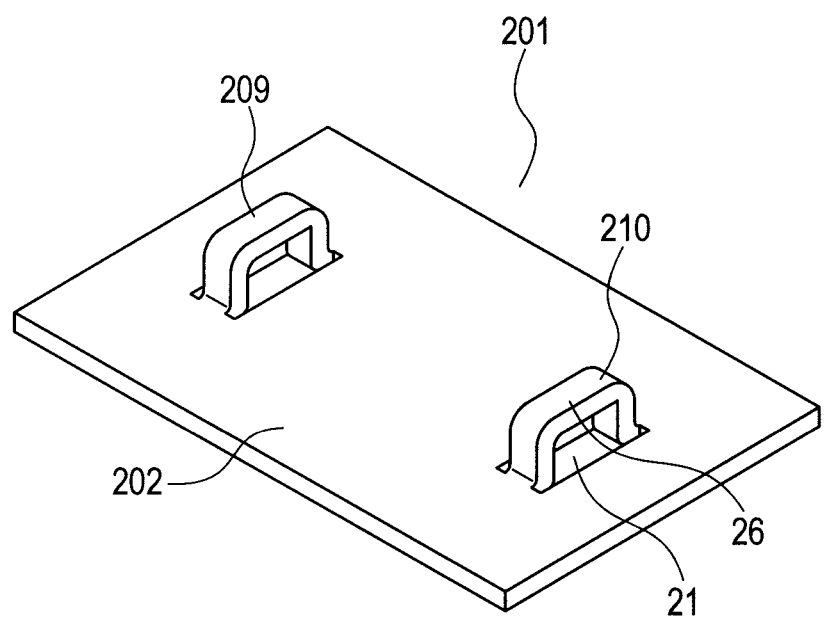
FIGS. 3A and 3B are views for describing a vibrator of a vibration type driving apparatus according to the second embodiment of the present invention.

The exemplary embodiments of the present invention will be described hereinafter.

First Embodiment

As the first embodiment, an example of the constitution of a vibrator for constituting a vibrating device of a vibration type driving apparatus, to which the present invention is applied, will be described with reference to FIGS. 1 and 2.

The vibrating device in the present embodiment, which is bonded to an electromechanical energy conversion element, has the vibrator on which one or more projection portions are formed.

This vibrating device is characterized in that the projection portions of the vibrator move with such a state of tracing an ellipsoidal trajectory within the X-Z plane depending on the synthesis of vibration of a first-order bending vibration mode in the width direction of the vibrator and vibration of a second-order bending vibration mode in the direction orthogonal to the width direction of the vibrator by an operation of applying an alternating electric field to the electromechanical energy conversion element.

Herewith, an object to be driven which was contacted with the projection portions of the vibrator can be moved to the direction of intersecting (typically, orthogonally intersecting) with the width direction by frictional driving.

More specifically, a vibrating device 111 of the present embodiment is constituted by a piezoelectric element 107 serving as the electromechanical energy conversion element formed in a rectangular thin plate shape and a vibrator 101 to be bonded to the one end surface of this piezoelectric element 107 as indicated in FIGS. 1 and 2.

Two projection portions 109 and 110 to be contacted with a slider (not illustrated) serving as an object to be driven are provided on the vibrator 101, and the slider is compressively contacted with the vibrator 101 through the projection portions 109 and 110.

When applying an alternating electric field to the piezoelectric element 107, the vibration by two bending vibration modes are excited at the vibrating device 111, and the vibration of elliptic motion is excited on contact surfaces on the projection portions 109 and 110.

As a result, the slider which is compressively contacted with the projection portions 109 and 110 receives frictional driving force and is driven to the X direction (feeding direction).

Here, the constitution of the vibrator 101 which constitutes the above-described vibrating device 111 will be described with reference to FIG. 2.

The vibrator 101 is constituted by a base 102 and the projection portions 109 and 110. These projection portions 109 and 110 are formed in the vicinity of nodes of a second-order bending mode (feeding mode) similar to a case in FIG. 8B-1 indicated in the related background art.

Here, each of the projection portions 109 and 110 is constituted by two wall portions 14a and 14b and a contact portion 16 for connecting the two wall portions with each other. In the present embodiment, although the two wall portions are provided, the wall portions may be increased in accordance with necessity. For example, each of the wall portions 14a and 14b can be divided into plural portions by providing slits or the like in between them.

A contact surface to be compressively contacted with the slider is formed on a surface of the contact portion 16.

The two wall portions 14a and 14b provided on the base 102 are in the same Z-Y plane. The wall portions are formed with such a state of extending to an out-of-plane direction of the above-described base, typically extending to the vertical direction against the base. However, it is not always required to extend to the vertical direction but can be constituted to have a certain inclined angle in accordance with necessity. Here, it should be noted that the "an out-of-plane direction" means such the direction which is not parallel to a main surface (a surface on which the above-described projection portions are formed) of the above-described base.

Namely, the projection portions 109 and 110 have two base roots collaterally set in the parallel direction to the direction (Y direction) of intersecting (typically, vertically intersecting) with the feeding direction (X direction). In the present invention, the "parallel" means a case of the strict parallel or it is allowed to shift from the parallel within a range of not giving a practical problem to the vibration property as well as a case of the design error. For example, even if it is shifted by 10 degrees from the parallel, such the inclination is tolerated in a case where the desired vibration can be obtained.

The wall portions are formed with a state of having the predetermined width and thickness. In the present embodiment, each of the wall portions is formed by a plate member of which the width is larger than the thickness, and it is formed that the thickness direction of the plate member is faced to the width direction of the vibrator and the width direction of the plate member is faced to the direction orthogonal to the width direction of the vibrator.

By adopting such the constitution, the thickness direction of the wall portions 14a and 14b becomes the Y direction, and since the width of the wall portions 14a and 14b becomes larger to the X direction, the projection portions 109 and 110 secure the predetermined rigidity to the X direction.

Figure 7A:
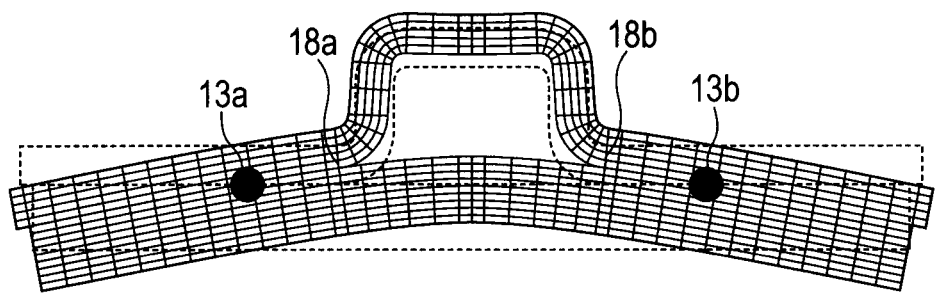
FIGS. 7A and 7B are cross-sectional views for describing a first-order bending mode (upthrust mode) of the vibrator according to the first embodiment of the present invention, where
Figure 7B:
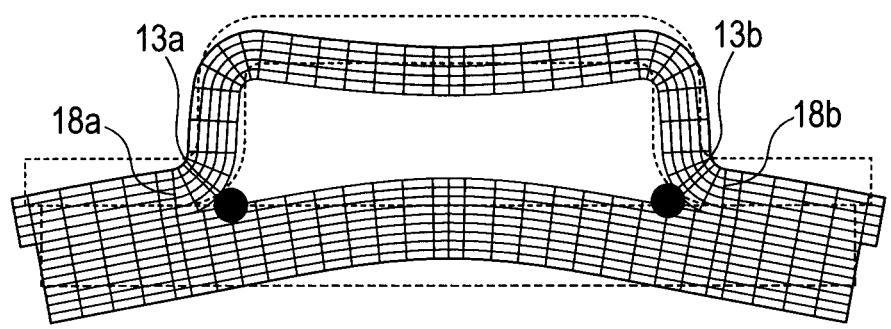
Figure 9A:
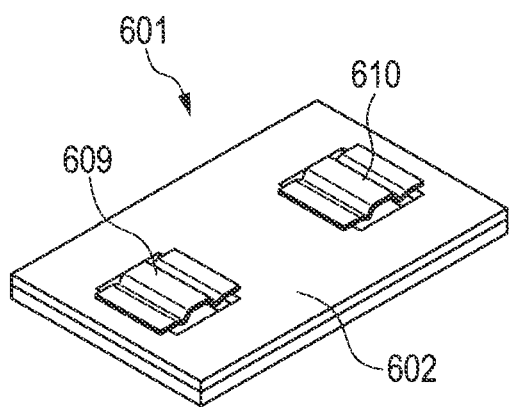
FIGS. 9A, 9B and 9C are views for describing the conventional vibration type actuator (linear ultrasonic motor) described in United States Patent Application Publication US2009/167111, where
Figure 9B:
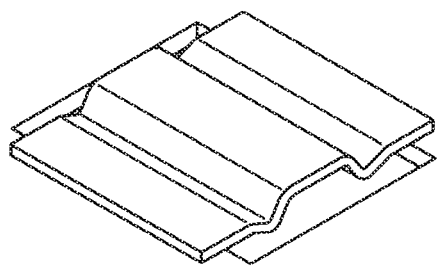
Figure 9B:
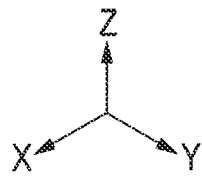
Figure 9C:
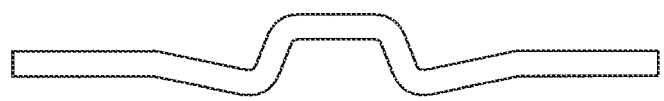

FIG. 7A is a cross-sectional view regarding a first-order bending mode as a result of performing an FEM (Finite Element Method) analysis with a state that the vibrator is bonded to the piezoelectric element, and FIG. 7B is a cross-sectional view regarding a second-order bending mode for the same analysis.

In case of the first-order bending mode of the present embodiment, as indicated in FIG. 7A, it is desirable that boundary portions 18a and 18b between the wall portions of the projection portion and the base 102 of the vibrator are located between nodes 13a and 13b in vibration of the first-order bending mode (upthrust mode) for the Y direction.

That is, it is desirable that the boundary portions 18a and 18b between the projection portions and the base are located at such places (positions), where the displacement directions of the Z direction (upthrust direction/normal direction) on a main surface of the base become the same direction in the first-order bending mode (upthrust mode). In case of the present embodiment, the boundary portions 18a and 18b between the projection portions and the base are located at such places (positions), where the displacement directions also become the same direction as that of the Z direction of a central portion of the base. In the present invention, the above-described "positions where the displacement directions become the same direction" means such positions which are in such a condition of displacing in the same direction in a case where an arbitrary moment is extracted at the time of vibration of the vibrator. That is, these positions are such positions which are in such a condition of displacing in the same direction at the same moment. Typically, the displacement between adjacent nodes is the same directional displacement. On the contrary, in a case where nodes are positioned in the order of A, B and C, the direction of the displacement between nodes A and B becomes inverse to the direction of the displacement between nodes B and C.

In the present invention, a fact of displacing to the Z direction (upthrust direction/normal direction) on a main surface of the base means that it is allowed that the component of the Z direction (upthrust direction/normal direction) on a main surface of the base is included in the displacement direction of that displacing portion.

Also, in the present invention, the boundary portions 18a and 18b can be provided at the outside of the nodes 13a and 13b in vibration of the first-order bending mode as indicated in FIG. 7B. In this case, since the deformation direction of a central portion of the base becomes opposite to the deformation direction of a central portion of a contact surface of the projection portion as compared with the case in FIG. 7A, although there is sometimes a case where transmission efficiency of force in the Z direction is relatively decreased when a contact surface of the projection portion contacts with the slider, there is not a practical problem. There is the significance in a point that design flexibility of the boundary portion between the projection portion and the base can be improved. However, also in this case, it is required that the boundary portions between the projection portions and the base are located at such places (positions), where the displacement directions of the Z direction (upthrust direction/normal direction) on a main surface of the base become the same direction. If the boundary portions between the projection portions and the base are located at such places (positions) where the displacement directions of the Z direction (upthrust direction/normal direction) on a main surface of the base become different (inverse) directions, the force transmission in the Z direction becomes unstable when the contact surface of the projection portion contacts with the slider, and stable driving cannot be obtained. As a specific example, it is a case where the boundary portion between the projection portion and the base is set with a state of crossing over the node 13b in FIG. 7A.

In the constitution illustrated in FIG. 2, the better contact condition between the vibrating device 111 and the slider can be realized by additionally giving springiness to the slider. A stable contact condition can be also realized by giving springiness to the contact portion without giving springiness to the slider. In this manner, by giving springiness to, at least, one of the slider or the contact portion, the contact condition for each of the vibrating device and the slider can be well maintained. In addition, even if height of the projection portions 109 and 110 is increased for the purpose of speeding up of driving, since the rigidity to the X direction, which is equivalent to the drive direction of the slider, of the projection portions 109 and 110 is secured by the wall portions 14a and 14b, a drive force of the vibrating device 111 can be efficiently transmitted to the slider.

In addition, as compared with a vibrator 501 having projection portions 503-1 and 504-1 indicated in FIG. 8A, the projection portion is formed to become the hollow construction surrounded by the base, the two wall portions and the contact portion which connects the one wall portion with the other wall portion.

Thus, since a space is held under the contact portion, the bending rigidity with an upthrust mode becomes to be decreased, and the electric power efficiency can be improved.

It should be noted that the width of the wall portions 14a and 14b may not be equal to the width in the X direction of the contact portion 16.

Also, the width of the wall portion 14a and the width of the wall portion 14b are not required to be the same along the Z direction.

For example, when the width of the wall portions 14a and 14b close to the base 102 is formed to become wider, the width of the wall portions 14a and 14b close to the contact portion 16 is formed to become narrower and the mean width of the wall portions 14a and 14b is formed to become wider, the rigidity of the wall portions 14a and 14b in the X direction can be increased.

As the manufacturing method of the vibrator according to the present embodiment, the vibrator can be manufactured by a process that, for example, the projection portions 109 and 110 are once formed and then these projection portions 109 and 110 are formed on the base 102 by a bonding method such as the laser welding or the adhesion.

Second Embodiment

As the second embodiment, an example of the constitution of a vibrator of which projection portions are integrally formed together with a base by performing a drawing process after providing plural slits or notches on the base will be described with reference to FIGS. 3A and 3B.

In the present embodiment, as illustrated in FIG. 3A, a through hole 21 is provided at a partial area of a base 202 under a contact portion 26 of a vibrator 201 differently from the case of the first embodiment.

Figure 3B:
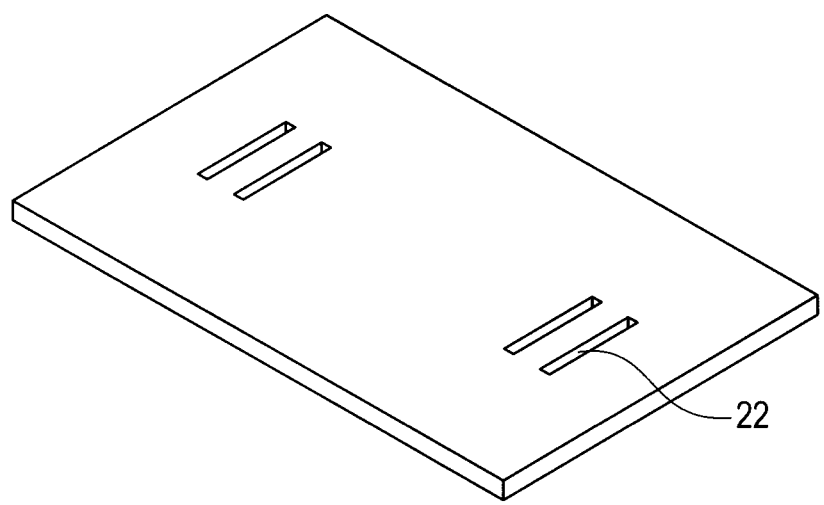

Consequently, as illustrated in FIG. 3B, slits 22 are provided on both sides of a portion where the drawing process is performed. Then, by performing the drawing process, the vibrator 201 which includes projection portions 209 and 210 can be integrally formed at a low cost.

It is enough by the little energy to generate the upthrust vibration by providing the through hole 21 at a partial area of the base 202. As a result, the drive efficiency can be improved.

Third Embodiment

As the third embodiment, an example of the constitution of a vibrator in a vibration type driving apparatus characterized by a mode different from the modes of the above-described respective embodiments will be described with reference to FIGS. 4A and 4B.

In the present embodiment, a through hole 31 is provided under a contact portion 36 of a vibrator 301 and a slit 32 is provided at the same time such that a base 302 is separated into two parts when projection portions are removed, differently from cases of the above-described respective embodiments.

According to this constitution, the vibrator which includes the projection portions can be integrally formed by a bending process.

It is enough by the little energy to generate the upthrust vibration by providing the through hole 31 and the slit 32 at partial areas of the base 302. As a result, the drive efficiency can be improved.

In the present embodiment, as a material of the vibrator, a stainless material, especially SUS420J2 or SUS440C being excellent in abrasion resistance, is used.

Figure 4A:
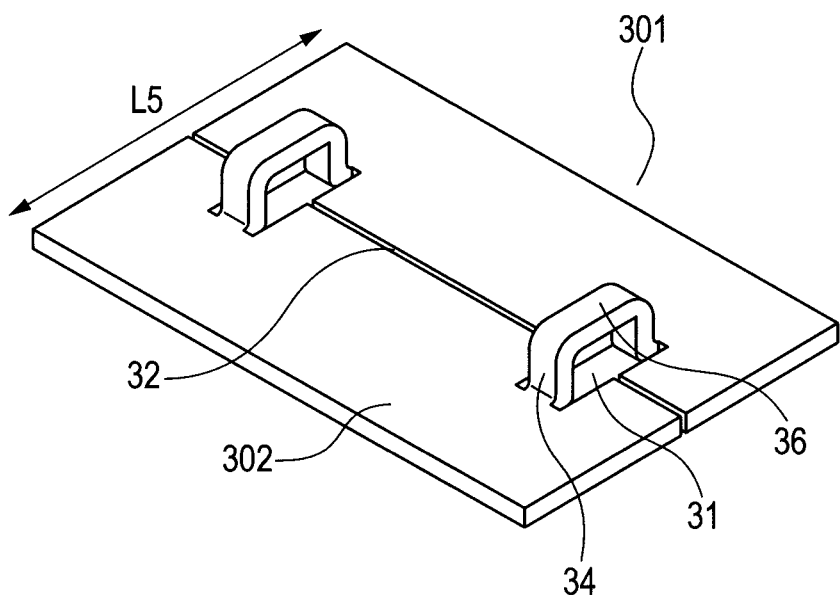
FIGS. 4A and 4B are views for describing a vibrator of a vibration type driving apparatus according to the third embodiment of the present invention.
Figure 4B:
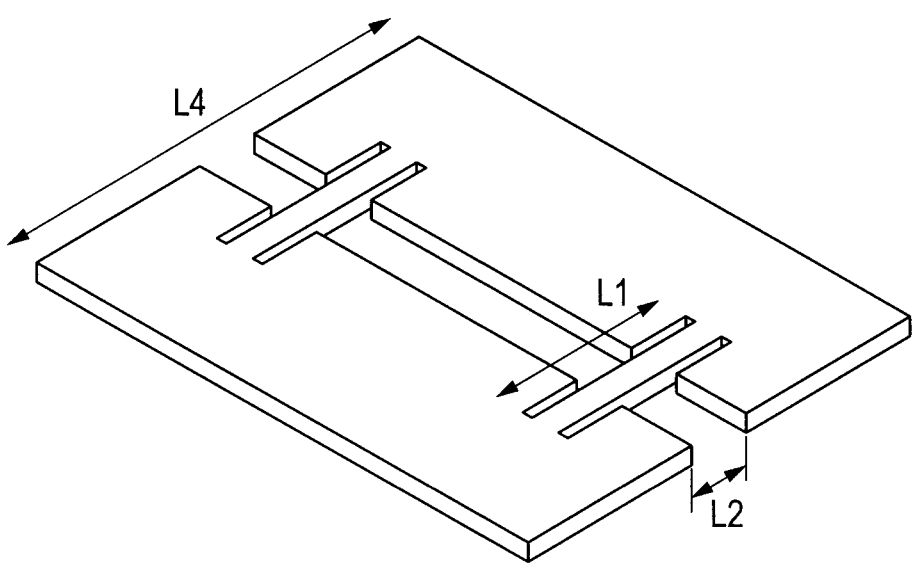

A plate, of which the size L4 is longer than the entire length L5 (i.e., the dimension in the Y direction) of the vibrator 301 to be manufactured, is prepared and then notched portions or slits are formed as illustrated in FIG. 4B.

The height of each of the projection portions can be arbitrarily set to the desired length by adjusting lengths L1 and L2 before the processing of the vibrator.

The notched portions are formed by etching, press-cutting or the like, and then the projection portions 109 and 110 are molded by a bending process.

The shape after the manufacture is resulted as illustrated in FIG. 4A, and a part of the notch portion becomes the narrow slit. As just described, the projection portions can be manufactured by the bending process without almost changing the thickness of the projection portions 109 and 110 before and after the manufacture.

As a result, limitations for the height or the shape of the manufacturable projection portions can be reduced, differently from a case of a drawing process or a forging process in which a high coefficient of extension is required for a plate to be used.

In addition, a wall portion 34 having high rigidity with the little decrease in the thickness of the projection portion can be molded, as compared with the drawing process.

Fourth Embodiment

As the fourth embodiment, an example of the constitution of a vibrator in a vibration type driving apparatus characterized by a mode different from the modes of the above-described embodiments will be described with reference to FIGS. 5A and 5B.

In the present embodiment, boundary portions between a base and wall portions of a projection portion are provided at the same place as that of phase of a central portion in an upthrust mode.

As the upthrust mode, not only a first-order bending mode but also a second-order or third-order bending mode may be used.

Figure 5A:
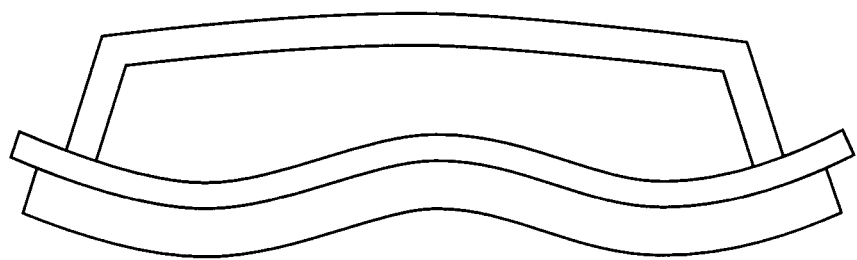
FIGS. 5A and 5B are views for indicating a third-order upthrust mode according to the fourth embodiment of the present invention.
Figure 5B:
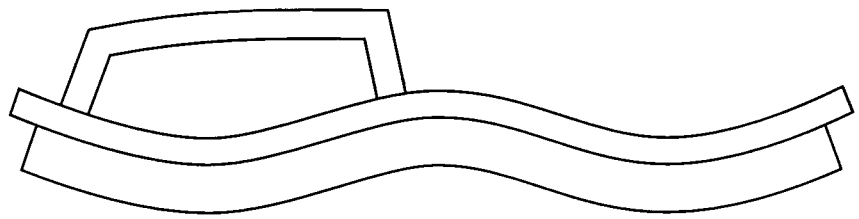

For example, in FIG. 5A, the base and a piezoelectric element are in a third-order bending mode, and the boundary portions between the base and the wall portions of the projection portion are located at such a place (position) of which the phase is the same phase including the central portion in the upthrust mode. That is, the boundary portions between the projection portions and the base are located at the place (position), where the displacement directions of the Z direction (upthrust direction/normal direction) of the base become the same.

According to this constitution, as indicated in the first embodiment, the phases of the two wall portions of the projection portion and the phase of the central portion of a contact surface of the projection portion become the same, whereby stable driving can be obtained. As illustrated in FIG. 5B, two boundary portions between the base and the wall portions of the projection portion may be provided unsymmetrically in regard to the center of the base.

Fifth Embodiment

As the fifth embodiment, an example of the constitution of a vibrator in a vibration type driving apparatus characterized by a mode different from the modes of the above-described embodiments will be described with reference to FIGS. 6A and 6B.

Figure 6A:
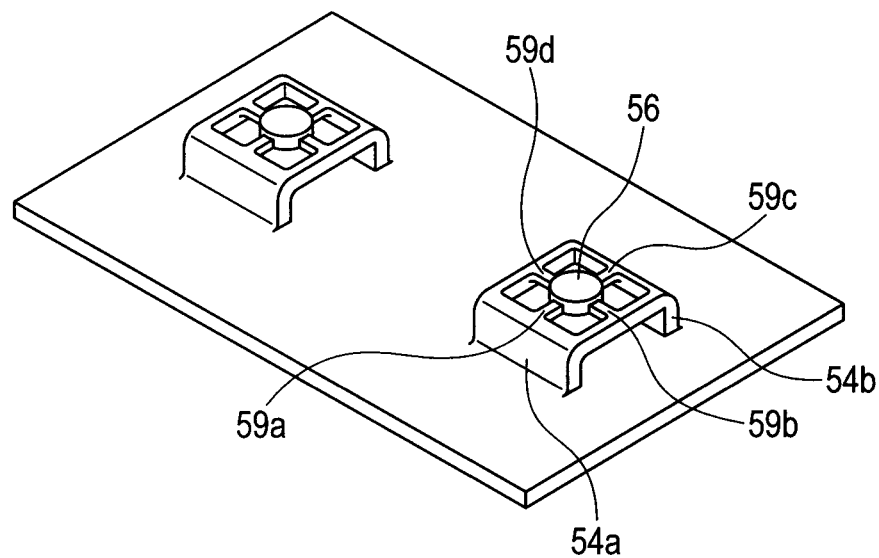
FIGS. 6A and 6B are views for describing a vibrator of a vibration type driving apparatus according to the fifth embodiment of the present invention.

In FIG. 6A, connecting portions 59a, 59b, 59c and 59d of which the rigidity in the Z direction is decreased are provided between a contact portion 56 and wall portions 54a and 54b, thereby realizing a stable contact even if the springiness is not given to a slider.

An upper surface of the contact portion 56 is provided at a higher position as compared with positions of upper surfaces of the connecting portions 59a, 59b, 59c and 59d, and it is constituted that the slider does not contact with the connecting portions 59a, 59b, 59c and 59d.

In such the form, since width of the wall portions 54a and 54b and width of the contact portion 56 can be independently set, it becomes possible to further improve the rigidity in the drive direction by increasing width of the wall portions.

Figure 6B:
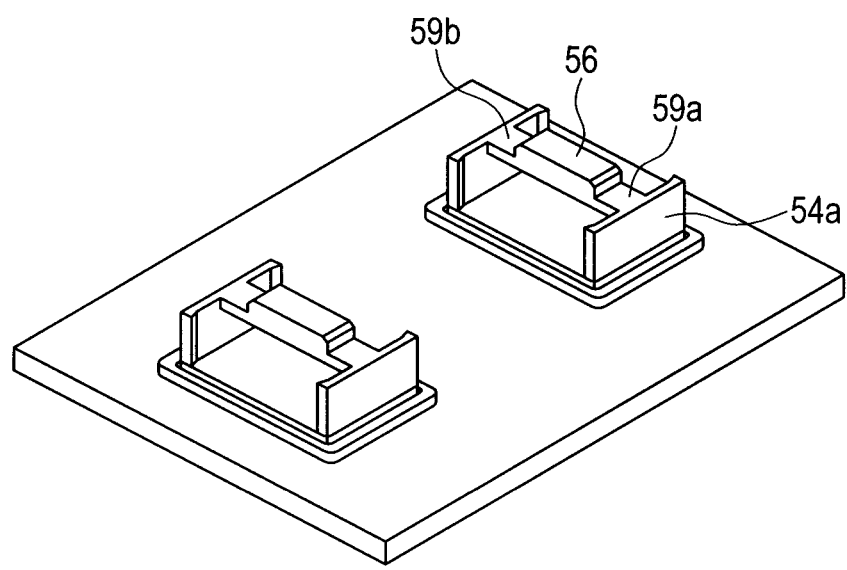

A case in FIG. 6B is similar to the above-described case, connecting portions 59a and 59b of which the rigidity in the Z direction is decreased are provided between the contact portion 56 and the wall portions 54a and 54b, thereby realizing a stable contact even if the springiness is not given to the slider.

An upper surface of the contact portion 56 is provided at a higher position as compared with positions of upper surfaces of the connecting portions 59a and 59b, and it is constituted that the slider does not contact with the connecting portions 59a and 59b.

In such the form, since width of the wall portions 54a and 54b and width of the contact portion 56 can be independently set, it becomes possible to further improve the rigidity in the drive direction by increasing width of the wall portions.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-058779, filed Mar. 16, 2010, No. 2010-261582, filed Nov. 24, 2010, and No. 2011-007695, filed Jan. 18, 2011, which are hereby incorporated by reference herein in their entirety.

What is claimed is:

1. A vibrating device comprising:
   a vibrator comprising:
      a base; and
      at least one projection portion, the at least one projection portion comprising:
         two wall portions which extend in a normal direction of the base, in a cross-sectional view including the normal direction; and
         a contact portion which has a contact surface connecting the two wall portions with each other; and
      an electro-mechanical conversion element bonded to the vibrator,
         wherein directions of displacement of the two wall portions in the normal direction on a main surface of the base are the same direction,
         wherein the at least one projection portion has a hollow construction which is formed by the two wall portions and the contact portion,
         wherein the at least one projection portion and the base are formed from a single piece, and
         wherein the electro-mechanical energy conversion element is overlapped with the at least one projection portion.

2. The vibrating device according to claim 1, wherein the contact portion has springiness.

3. The vibrating device according to claim 1, wherein each of the wall portions comprises a plate member which has a width that is larger than a thickness, and
   wherein a thickness direction of the plate member is pointed toward the width direction of the vibrator, and a width direction of the plate member is pointed toward a direction intersecting with the width direction of the vibrator.

4. The vibrating device according to claim 1,
   wherein a through-hole is formed in a partial region of the base positioned between the at least one projection portion and the electro-mechanical energy conversion element.

5. The vibrating device according to claim 1, wherein the at least one projection portion is formed integrally with the base through plural slits or notches.

6. The vibrating device according to claim 1, wherein a displacement direction of a central portion of the base in the normal direction is same as the displacement directions of the two wall portions.

7. The vibrating device according to claim 1, wherein the contact surface is for being in contact with an object to be driven.

8. The vibrating device according to claim 5,
   wherein the at least one projection portion and the base are formed from the single piece, and
   wherein the plural slits or notches are formed in the base.

9. A vibrating type driving apparatus comprising:
   the vibrating device according to claim 1; and
   an object which is driven by the vibrating device.

10. The vibrating device according to claim 1, wherein the at least one projection portion and the base are formed by processing the single piece.

11. The vibrating device according to claim 1,
   wherein the two wall portions and the contact portion surround a space, and
   wherein the two wall portions are located around the space with a gap.

12. The vibrating device according to claim 1,
   wherein the cross-section view is perpendicular to a driving direction of the vibrating device.

13. The vibrating device according to claim 1,
   wherein elliptic motion arises at the at least one projection portion of the vibrator by application of an alternating electric field to the electro-mechanical energy conversion element.

14. The vibrating device according to claim 1,
   wherein the at least one projection portion comprises boundary portions between the base and the respective wall portions, and
   wherein the boundary portions are provided at positions where directions of displacement of the boundary portions in the normal direction on the main surface of the base are the same direction.

15. A vibrating device comprising:
   a vibrator comprising:
      a base; and
      at least one projection portion comprising, in cross-sectional view including a normal direction of the base:
         two wall portions which extend in the normal direction of the base; and
         a contact portion between the two wall portions; and
      an electro-mechanical conversion element bonded to the vibrator, wherein the at least one projection portion has a hollow construction which is formed by the two wall portions and the contact portion, wherein the at least one projection portion and the base are formed from a single piece, and wherein the electro-mechanical energy conversion element is overlapped with the at least one projection portion.

16. The vibrating device according to claim 15, wherein the contact portion has springiness.

17. The vibrating device according to claim 15, wherein the at least one projection portion comprises boundary portions between the base and the respective wall portions, and wherein the boundary portions are provided at positions where directions of displacement of the boundary portions in the normal direction on a main surface of the base are the same direction.

18. The vibrating device according to claim 15, wherein each of the wall portions comprises a plate member which has a width that is larger than a thickness, and wherein a thickness direction of the plate member is pointed toward the width direction of the vibrator, and a width direction of the plate member is pointed toward a direction intersecting with the width direction of the vibrator.

19. The vibrating device according to claim 17, wherein a displacement direction of a central portion of the base in the normal direction is same as the displacement direction of the boundary portions.

20. The vibrating device according to claim 15, wherein the at least one projection portion and the base are formed by processing the single piece.

21. A vibrating type driving apparatus comprising:

the vibrating device according to claim 15; and an object which is driven by the vibrating device.

22. The vibrating device according to claim 15, wherein the cross-sectional view is a view of a plane perpendicular to a driving direction of the vibrating device.

23. The vibrating device according to claim 15, wherein elliptic motion arises at the at least one projection portion of the vibrator by application of an alternating electric field to the electro-mechanical energy conversion element.

24. A vibrating device comprising:

a vibrator comprising:

a base; and at least one projection portion comprising, in cross-sectional view including a normal direction of the base:

two wall portions which extend in the normal direction of the base; and a contact portion between the two wall portions; and an electromechanical energy conversion element bonded to the vibrator, wherein the two wall portions are between two nodes in vibration of a bending mode of the vibrating device, the two nodes being adjacent each other, wherein the at least one projection portion has a hollow construction which is formed by the two wall portions and the contact portion, and wherein the at least one projection portion and the base are formed from a single piece.

25. The vibrating device according to claim 24, wherein the contact portion has springiness.

26. The vibrating device according to claim 24, wherein each of the wall portions comprises a plate member which has a width that is larger than a thickness, and wherein a thickness direction of the plate member is pointed toward the width direction of the vibrator, and a width direction of the plate member is pointed toward a direction intersecting with the width direction of the vibrator.

27. The vibrating device according to claim 24, wherein the at least one projection portion comprises boundary portions between the base and the respective wall portions, and wherein a displacement direction of a central portion of the base in the normal direction is same as a displacement direction of the boundary portions.

28. The vibrating device according to claim 24, wherein the cross-sectional view is a view of a plane perpendicular to a driving direction of the vibrating device.

29. The vibrating device according to claim 24, wherein elliptic motion arises at the at least one projection portion of the vibrator by application of an alternating electric field to the electromechanical energy conversion element.

* * * * *